United States Patent Office 3,502,560
Patented Mar. 24, 1970

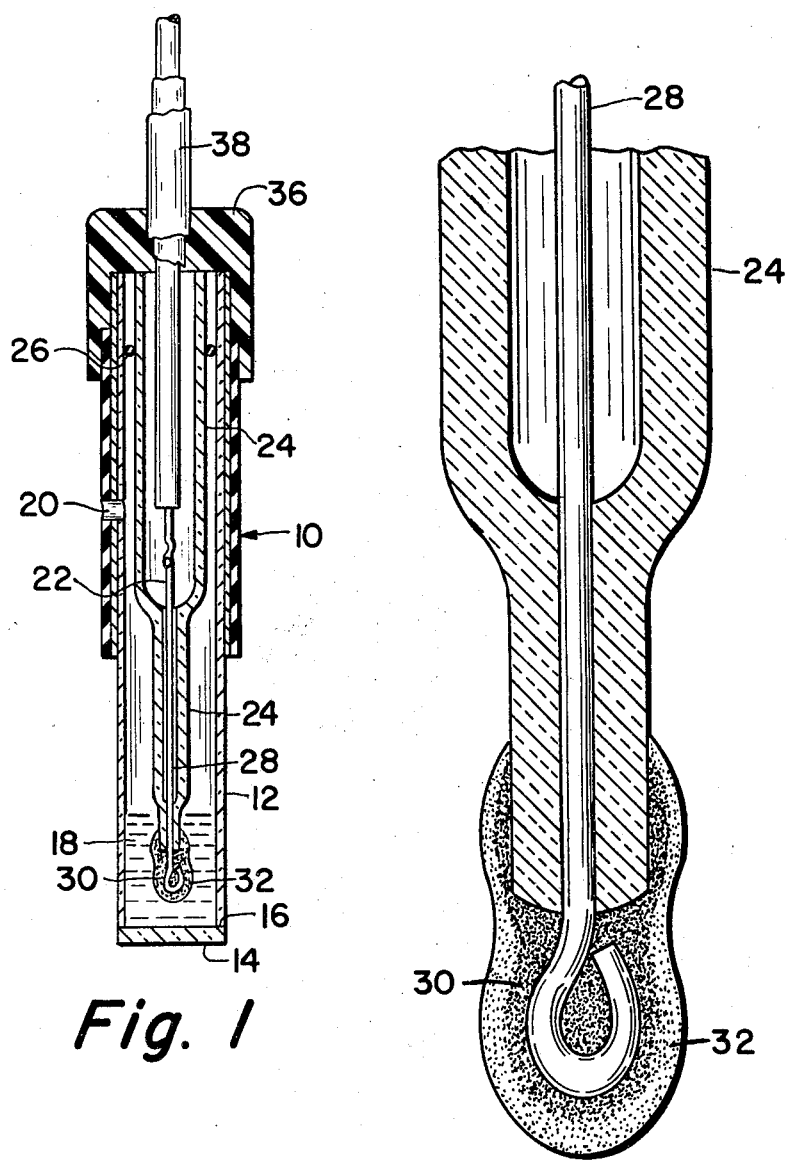

3,502,560
ELECTROCHEMICAL APPARATUS
Warren M. Wise, Big Flats, N.Y., assignor to Corning Glass Works, Corning, N.Y., a corporation of New York
Filed May 1, 1968, Ser. No. 725,786
Int. Cl. B01k 3/10
U.S. Cl. 204—195   15 Claims

ABSTRACT OF THE DISCLOSURE

An improved electrode for determining the concentration of ionic species in an aqueous solution and more particularly, an organic ion exchange electrode having a solid state internal reference electrode.

---

Electrochemical instruments are well known in analytical chemistry for furnishing very rapid and accurate determinations of chemical constituents in solution. A commonly used laboratory instrument of this type is the pH meter which essentially is made up of a hydrogen sensing electrode, a reference electrode, and a potentiometer. The two electrodes are simultaneously immersed into a test solution such that an electrochemical cell develops, the potential generated by the electrodes being approximately proportional to the logarithm of the reciprocal of the hydrogen ion concentration.

The most convenient and versatile of the hydrogen sensing electrodes is the glass electrode so called because it has a glass membrane at which the electropotential arises. As a more recent development, it was found that glass electrodes sensitive to ions other than hydrogen, such as sodium and potassium, could be made from special glass compositions as described in United States Patents No. 2,829,090 and No. 3,041,252. However, because of the rigid and solid structure of the glass membrane, such electrodes are primarily sensitive to monovalent ions. It is believed that the glass electrodes function by exchange of ions at the interface between the glass and the solution under test. The mobility particularly of ions having a valence charge greater than one is limited in glass, even though the glass may include ion-exchange sites adequate both spatially and electrically to accept polyvalent ions. While glass electrodes have met with considerable acceptance because of their relative insensitivity to either reducing or oxidizing agents in the test solution, the sensitivity has been limited to cations and it has been urged on theoretical grounds that such electrodes cannot exhibit anionic sensitivity.

Structurally, the glass electrode includes the elements of a glass tube or container, an internal reference electrode, an ion sensing membrane, and a liquid electrolyte contact between the membrane and the internal reference electrode. It is the glass membrane, located so as to cover the opening at the lower end of the glass tube, which makes the electrode selective or sensitive to a particular ion in preference to other ions in the same solution. The ion exchange occurs at the interface between the glass membrane and the test solution, a solid-liquid interface, to give rise to an electropotential. Thus, the membrane has two primary functions: firstly, it acts as a site for the ion exchange and secondly, it serves as a barrier to separate the internal electrolyte solution from the test solution and to prevent it from becoming contaminated.

In view of the limitations for ion exchange in the glass membrane, a radically different approach in making electrodes was discovered by J. W. Ross and is disclosed in a copending patent application Ser. No. 390,016, filed on Aug. 17, 1964, now U.S. Patent No. 3,429,785. This concept essentially relates to a liquid membrane at which ion exchange occurs formed at the interface between an organic ion exchanger liquid and the aqueous test solution. The electropotential developed at this interface is sensed by the internal reference electrode and finally recorded on the potentiometer. While the first function of the liquid membrane in the Ross electrode is transferred to the organic ion exchanger liquid, it is nevertheless necessary in any practical embodiment to prevent the organic ion exchanger liquid from substantially leaving the electrode body by placing an inert porous barrier across the lower portion of the container element.

The copending patent application of Settzo et al., Ser. No. 547,253, filed May 3, 1966, now U.S. Patent No. 3,448,032, discloses an improvement in the organic ion exchange electrode wherein the membrane is an organophilic-hydrophobic porous membrane. This selectively permeable membrane is substantially impermeable to the aqueous test solution and preferentially permeable to the organic phase such that when the electrode is dipped into an aqueous solution, the interface at which ion exchange occurs is located in the proximity of the outer surface of the membrane. The organic ion exchange liquid saturates the pores of the membrane and is permitted to flow through the membrane in extremely minute amounts.

The organic ion exchange electrode used heretofore and as described in the Settzo et al. application required an internal reference electrode containing an aqueous electrolyte solution, such as saturated potassium chloride solution, which is separated from the organic ion exchange phase by a separating means or plug. While this configuration of an electrode gives satisfactory results, it is nevertheless difficult to maintain the aqueous electrolyte solution within the organic ion exchange electrode.

Quite surprisingly, I have now discovered an improved organic ion exchange electrode in which the internal electrode element in the solid state form can be placed directly in the organic ion exchange liquid and thereby avoids the requirement of an aqueous internal solution.

In accordance with the present invention, I have discovered an electrode for measuring the concentration of an ionic species in an aqueous solution, the electrode comprising a liquid organic phase containing an ion exchange material capable of exchanging ions with the aqueous solution, said organic phase being substantially immiscible with the solution; a means for so containing the organic phase as to provide an interface for ion exchange contact between said organic phase and the aqueous solution; and an internal reference electrode comprising a metallic element having an inner coating of a fused salt consisting of silver chloride, potassium chloride, sodium chloride or mixtures thereof and an outer coating of a fused salt mixture consisting of 0.2–5.0 weight percent of lithium chloride and the remainder consisting of sodium nitrate, potassium nitrate and mixtures thereof. For all practical purposes the melting temperature of the outer coating must be less than that of the inner coating.

This invention is more clearly understood from the following description taken in conjunction with the accompanying drawing in which:

FIG. 1 is a cross-sectional view of a representative electrode formed according to the principles of the present invention.

FIG. 2 is an enlarged cross-sectional view of a fragment of the internal solid state reference electrode employed in the embodiment of FIG. 1.

Referring now to the drawings, in the embodiment illustrated by FIG. 1, an ion exchange electrode 10 of the present invention is comprised of an electrically insulating container such as an outer glass tube 12 having an opening at each end thereof. One end of the tube 12 is tightly capped with an organophilic-hydrophobic, porous ceramic membrane 14 attached to the glass tube 12 by means such as solder glass 16 or by a direct seal. The interior portion of the glass tube 12 is filled with an organic ion exchange liquid 18 which may be either a liquid ion exchanger per se, a normally solid ion exchanger dissolved in a suitable solvent or a normally liquid ion exchanger diluted with an appropriate diluent. When assembled in actual use the ion exchange liquid 18 is in contact with and fills the pores of the membrane 14. In order to permit the ion exchange liquid 18 to very gradually flow through the pores of the membrane 14, a vent 20 may be placed in the glass tube 12 to prevent the formation of a vacuum. Immersed directly in the ion exchange liquid 18 and in electrical contact therewith is an internal reference electrode 22. The internal reference electrode 22 is made up of an inner glass tube 24 held in place by means of an O-ring 26, a metal wire 28 with an inner coating 30, e.g. a fused salt mixture of silver chloride and potassium chloride, and an outer coating 32, e.g. a fused salt mixture of lithium chloride, sodium nitrate and potassium nitrate. The end of the tube 12 is suitably capped by lid 36 which acts both as a closure and a support for electrically conductive lead 38 which forms part of the internal reference electrode 22. The electrode of FIG. 1 is employed by contacting the outer surface with a membrane 14 with an aqueous test solution. Membrane 14 provides a mechanical support which retains the ion exchange liquid 18 within the tube 12 while also permitting the formation of an effective ion exchange liquid-liquid interface on the outer surface of the membrane 22 between the organic ion exchange liquid 18 and the aqueous test solution.

In the enlarged cross-sectional view shown in FIG. 2 the significant parts of the internal reference electrode 22 are shown. A silver wire 28 is embedded in and protested by the glass tube 24. Only the end portion of the silver wire 28 in the form of a loop extends through the bottom of the tube 24 which is sealed to the wire. The portion of the wire, extending through the glass seal is initially coated with an inner coating 30 which may be silver chloride, potassium chloride or sodium chloride or mixtures thereof. In a preferred embodiment the inner coating 30 consists of a mixture of 86.4 weight percent silver chloride and 13.6 weight percent potassium chloride which has a melting temperature of about 350° C. While in general sodium chloride can be substituted for potassium chloride, it was found that sodium chloride does not work as well.

After the inner coating 30 has fused and cooled, an outer coating 32 is then applied over the inner coating 30 to protect the silver ions from directly contacting and reacting with the organic ion exchange liquid 18; in the organic ion exchange electrode known heretofore, the Ag/AgCl internal electrode element was isolated from the organic ion exchange liquid by a saturated potassium chloride solution contained in a separate glass tube. The outer coating 32, in addition to being ionically conducting and protecting the inner coating, must also be capable of being applied without dissolution or liquification of the inner coating. Usually the outter coating 32 is applied by dipping in a molten salt bath and, therefore, for all practical purposes, it is necessary that the outer coating 32 have a melting temperature below that of the inner coating 30. Preferably, the melting temperature should be about 50° C. below that of the inner coating 30. In terms of composition, the outer coating is a fused salt mixture consisting essentially of 0.2–5.0 weight percent of lithium chloride and the remainder being potassium nitrate, sodium nitrate or mixtures thereof. The preferred lithium chloride content is in the range of about 1.5–2.5 percent. The potassium nitrate and sodium nitrate of the outer coating are preferably used in mixture. The eutectic mixture containing approximately 54% by weight of potassium nitrate and 46% by weight sodium nitrate, is most desirable since it has a low melting temperature of 222° C. On the other hand, the pure sodium nitrate or potassium nitrate salts are less desirable since both of these compounds have high melting temperatures over 300° C. An example of a fused salt mixture particularly useful in forming the outer coating of the electrode consists of 2.1 weight percent lithium chloride, 44.9 weight percent sodium nitrate and 53.0 weight percent potassium nitrate.

For purposes of definition, liquid ion-exchange, as the concept and variations of the phrase are used herein, is intended to refer to a liquid system that apparently operates by interchange of ions at an interface between an aqueous phase and an organic phase which is substantially immiscible with the former, there being negligible distribution of the aqueous and the organic liquid phases in one another.

A large number of ion-exchange materials can be used, both of the anionic and cationic type as discussed in the abovementioned Ross application. The ion-exchange material can be liquid per se under normal conditions. Among typical cation-exchangers of the liquid type are a number of normally liquid organophosporic acids, such as bis (2-ethylhexyl) phosphoric acid and either or both of the mono- and di- forms of n-butyl phosphoric acid and amyl phosphoric acid.

Certain carboxylic acids are known liquid cation-exchangers such as, for example caproic acid and caprylic acid. Similarly, liquid cation-exchangers among the perfluorocarboxylic acids are typified by perfluorobutyric acid.

A number of liquid anion-exchangers are also known, particularly the primary, secondary and tertiary amines, typical examples of each of which are respective N-trialkylmethylamine, N-lauryl-N-trialkylmethylamine, and N,N,N-triiso-octylamine.

In addition to those ion-exchangers which under normal conditions of temperature and pressure are liquid, other normally solid exchangers are useful in the present invention when dissolved in an appropriate liquid. For example, among the useful solid ion-exchangers are the known solid amines, quaternary ammonium salts, pyridinium salts, alkyl and aryl phosphates and phosphites, sulfonates and many others. Typical examples of such solid exchangers are dioctadecyl amine, tetraheptyl ammonium iodide, cetyl pyridinium chloride, nonadecylphosphoric acid, and dinonylnaphthalene sulfonic acid.

The exchanger materials preferred in one important aspect of the invention are characterized in possessing the property of being highly soluble (and thus, where applicable, highly miscible) in an organic solvent, and substantially insoluble in the aqueous solution under test. Typically, the exchanger material selected then possesses, as a part of the exchanger ion, an organic group or groups (alkyl, aryl, aralkyl or the like) of sufficient size (preferably a chain of six or more carbon atoms) or nature so as to provide a comparatively massive ion which is relatively soluble in an organic solvent but exhibits substantial insolubility in the aqueous solution.

The use of an organic solvent liquid with exchanger material provides several advantages over the direct use of a liquid ion-exchanger alone and has fuctions other than merely solvent use with solid ion-exchangers. For example, by use of an appropriate mediator liquid, one can adjust the dielectric constant of the mixture thus formed, can adjust the mobility of the sites roughly in accordance with the viscosity of the mediator liquid, can adjust site density in accordance with the ratio of mediator liquid to ion-exchanger, and of course, the nature of the ion-sensitive site can be varied according to the type of ion-exchanger employed with a particular mediator liquid. The ion-exchanger reaction can thus be mediated in accordance with the solvent or mediator liquid selected. The mediator liquid, whether functioning as a solvent for a normally solid ion-exchanger material, or as a diluent or mediator for an ion-exchanger liquid, preferably has a high enough dielectric constant, i.e. the volume resistivity of the ion-exchanger liquid will be sufficiently low, such that the impedance presented to an electrometric measuring device is not so high as to require elaborate shielding or ultra-high sensitivity devices of prohibitive cost.

The use of a mediator liquid having a relatively high dielectric constant requires that the liquid be chosen with considerable care, inasmuch as the characteristic of a high dielectric constant due to large dipole moments is frequently accompanied by comparatively good solubility in polar solvents, such as water. However, this is not always the case, and a number of mediators with appropriate properties are known. For example, some of the mediators suitable for use with ion-exchangers in the present invention are alcohols which preferably have long aliphatic chains in excess of eight carbon atoms, such as octyl and dodecyl alcohols; ketones such as 2-pentanone; aromatic compounds such as nitrobenzene and orthodichlorobenzene; trialkylphosphonates; and a mixture containing high molecular weight hydrocarbon aliphatic compounds, such as mineral oils, in phosphonates or the like. It also appears that despite the desirability of high dielectric constant for the mediator, the ion selectivity exhibited by the exchanger dissolved in the mediator is greater when the dielectric constant is low. Thus, the selection of mediator characteristics will often be a compromise.

The membrane is of a porous material which is organophilic, i.e. substantially permeable to the organic phase and thereby permitting the flow of the organic liquid ion exchanger through the pores, and at the same time hydrophobic, i.e. substantially impermeable to the aqueous phase or solution and not wet by water. When the electrode is placed in the aqueous test solution, an interface is formed between the organic phase and the aqueous phase on the outside surface of the membrane. At this liquid-liquid interface, ion exchange occurs and as a result an electropotential is developed. The advantageous of such an arrangement is that the interface is continuously being provided with fresh sensing material due to the slow but finite flow of organic solution through the membrane. In addition, since the aqueous phase does not wet the membrane, response times are usually rapid and there is a minimum tendency to transfer test solution from one measurement to the next. Furthermore, in storage of the electrode, immersion in an aqueous solution to prevent drying out of the membrane is not necessary.

Materials from which the membrane can be made are usually not organophilic-hydrophobic initially without being subjected to a treatment. I have found particularly suitable materials to be microporous ceramics and glasses. An example of a typical material is a fritted glass disc made from sintered or cast glass particles such as are commercially available as porous filters and sold under the trademark Pyrex brand fritted ware. It is also possible to make porous glass membranes from leached phase-separated glasses such as alkali borosilicate glass used in making reconstituted glass. Preferably, the thickness of glass membranes should be about 0.5 to 0.8 mm. and the membrane pores should have a nominal maximum pore size of 0.9 to 1.4 microns such as designed for Ultra-Fine filtration (porosity of pore diameter being determined in same manner as specified in A.S.T.M. E128).

In most instances, it is necessary to coat the membrane with a treating agent to impart to the membrane an organophilic-hydrophobic property since the membrane material itself tends to be wet by water. The treating agent must be capable of forming a thin film over the pores of the membrane while not interfering with the desired flow through characteristics by plugging up the pores. It should be substantially insoluble in either the organic or the aqueous phase and be relatively permanent. Application of the coating can be achieved by curing the coating on the substrate such as by polymerization in the process of heat and catalyst or both, or by sorbing or reacting the coating material with the substrate. Typical treating agents are broadly designated as silicones, and include the silcone fluids.

Frequently, it is necessary to dilute the treating agent with a volatile solvent which tends to give a much thinner coating. The silicone treating agents are usually applied as a dilute solvent solution prepared by adding hydrocarbon solvents, acetone, trichloroethylene or methylethylketone and stirring to obtain a uniform solution. A representative liquid treating agent is Dow Corning's 1107 fluid, a liquid silicone polymer (viscosity at 77° F. of 30 centistokes) that cures to a clear slick, semi-rubbery surface coating, which is typically added in dilution of 0.1 to 3.0%. This solution can be conventionally applied by dipping or impregnating and thereafter curing the coating usually at elevated temperatures of 250 to 300° F.

My invention is further illustrated by the following examples:

EXAMPLE I

An electrode was prepared having the configuration as shown in FIGURE 1. An ultrafine fritted glass disc sold under the trademark Pyrex brand fritted filters and having a nominal maximum pore size of 0.9 to 1.4 microns was attached to the end of a piece of Pyrex brand glass tubing (Code 7740) by means of a sealing glass, and the disc was then ground to a thickness of approximately 30 mils. A solution containing 2.5% by volume of a liquid silicone polymer (Dow Corning 1107 fluid) in trichloroethylene was poured into the tube and forced with compressed air through the pores of the disc. The solution was also applied to the outside surface of the disc. After the organic solution had been in contact with the glass surfaces for 10 minutes, the excess was poured off and the tubing was heated in an oven at a temperature of 170° C. for a time of 15 minutes.

The organic ion exchanger solution was prepared as a 1.0% (w./v.) calcium didecylphosphate solution in dioctylphenylphosphonate. About one ml. of the ion exchange solution was placed in the tube and used to saturate the membrane.

The internal reference electrode element was prepared from a silver wire which was coated with an inner AgCl/KCl coating and an outer LiCl/NaNO$_3$/KNO$_3$ coating. One end of a pure silver wire was shaped into a elliptical loop and a portion of the wire above the loop was flame sealed into a piece of potash soda lead glass (Corning Glass Code 0120) tubing such that the loop remained exposed. The loop of the wire was then dipped into a molten melt containing 13.6 weight percent KCl and 86.4 weight percent AgCl at a temperature of 350° C. Upon removing from the melt and cooling, the exposed portion of the wire was completely covered with a layer of the solidified melt. Thereafter the coated wire was dipped in a second molten melt at a temperature of 225° C. containing 2.1 weight percent LiCl, 44.9 weight percent NaNO$_3$ and 53.0 weight percent KNO$_3$, and after being removed from the melt, the inner coating was completely covered with a layer of the second solidified melt. Prior to being inserted in the electrode of FIG. 1, the element was aged by soaking in the organic ion exchange solution.

The electrode was shielded with aluminum foil, attached to a gound and then plugged into a Corning Model 12 pH meter. A saturated calomel electrode was used as a reference. When tested for response to a prepared solution having varying calcium ion concentrations, the following results were obtained:

| Ion | Concentration | Millivolt |
|---|---|---|
| $Ca^{++}$ | $10^{-4}M$ | −161.8 |
| $Ca^{++}$ | $10^{-3}M$ | −133.5 |
| $Ca^{++}$ | $10^{-2}M$ | −109.0 |
| $Ca^{++}$ | $10^{-1}M$ | −82.7 |

The electrode showed approximate Nernstian responses for calcium ions taking into account the activity coefficient of the ion in the test solution. These responses should be approximately 24–28 millivolts for decade increases in calcium ion concentration. The speed of response of the electrode was rapid and the electrode stability was excellent.

EXAMPLE II

Following the procedure and using the apparatus of Example I including the internal reference electrode element, an electrode was prepared using as the ion exchanger solution 1% (w./v.) calcium didecylphosphate in decanol.

The following results were obtained when the electrode was tested in pure single salt solutions of divalent ions of varying concentrations:

| Ion | Concentration | Millivolt |
|---|---|---|
| $Ca^{++}$ | $10^{-4}M$ | −149.6 |
| $Ca^{++}$ | $10^{-3}M$ | −125.0 |
| $Ca^{++}$ | $10^{-2}M$ | −100.5 |
| $Ca^{++}$ | $10^{-1}M$ | −78.5 |
| $Mg^{++}$ | $10^{-4}M$ | −133.8 |
| $Mg^{++}$ | $10^{-3}M$ | −108.6 |
| $Mg^{++}$ | $10^{-2}M$ | −83.1 |
| $Mg^{++}$ | $10^{-1}M$ | −59.1 |

The results indicate that the electrode was satisfactory in determining the concentration of divalent ions.

It will be apparent to those skilled in the art that many variations and modifications of the invention as hereinabove set forth may be made without departing from the spirit and scope of the invention. The invention is not limited to those details and applications described, except as set forth in the appended claims.

I claim:
1. An electrode for measuring the concentration of an ionic species in an aqueous solution comprising:
    (a) a liquid organic phase containing an ion exchange material capable of exchanging ions with the aqueous solution, said organic phase being substantially immiscible with the solution;
    (b) a means for so containing the organic phase, as to provide an interface for ion exchange contact between said organic phase and the aqueous solution; and
    (c) an internal reference electrode comprising a metallic element having an inner coating of a fused salt consisting essentially of silver chloride, potassium chloride, sodium chloride or mixtures thereof and an outer coating of a fused salt consisting essentially of 0.2–5.0 weight percent of lithium chloride and the remainder potassium nitrate, sodium nitrate, or mixtures thereof, said internal reference electrode being in electrical contact with the liquid organic phase.

2. The electrode of claim 1, wherein said means comprises a container for said organic phase having an opening at a portion and an organophilic-hydrophobic porous membrane covering said opening whereby minute amounts of the organic phase are permitted to flow through the membrane and form an interface with the aqueous phase at the surface of the membrane adjacent to said aqueous phase.

3. The electrode of claim 2, wherein said metallic element is silver.

4. The electrode of claim 3 for use in measuring the concentration of cationic species, wherein said liquid organic phase contains an organic cation exchange material capable of exchanging cations with the aqueous phase and being substantially immiscible with the aqueous phase.

5. The electrode of claim 4, wherein said cationic species is alkaline earth metal.

6. The electrode of claim 5 for use in measuring calcium ion concentration in an aqueous phase comprising:
    (a) a liquid organic phase of a solution of calcium didecylphosphate in a solvent of dioctyl-phenylphosphonate, said phase being substantially immiscible with the aqueous phase;
    (b) an outer glass tube for containing said organic phase having an opening at one end;
    (c) an organophilic-hydrophobic porous membrane covering said opening whereby minute amounts of the organic phase are permitted to flow through the membrane and form an interface with the aqueous phase at the surface of the membrane adjacent to said phase; and
    (d) an internal reference electrode comprising a silver wire having an inner coating of a fused salt consisting essentially of about 86.4 percent by weight of silver chloride and 13.6 percent by weight of potassium chloride and an outer coating of a fused salt consisting of about 2.1 percent by weight of lithium chloride, 44.9 percent by weight of sodium nitrate and 53.0 percent by weight of potassium nitrate, said internal reference electrode being in electrical contact with the liquid organic phase.

7. The electrode of claim 5, wherein the liquid organic phase is a solution of calcium didecylphosphate in a solvent of decanol.

8. The electrode of claim 3 for use in measuring the concentration of anionic species, wherein said liquid organic phase contains an organic anion exchange material capable of exchanging anions with the aqueous phase and being substantially immiscible with the aqueous phase.

9. The electrode of claim 8 wherein said anionic species is a halogen ion.

10. The electrode of claim 3 wherein the inner coating consists essentially of a mixture of silver chloride and potassium chloride.

11. The electrode of claim 10, wherein said mixture is about 86.4 weight percent silver chloride and 13.6 weight percent potassium chloride.

12. The electrode of claim 3, wherein the outer coating has a melting temperature of at least 50° C. below the melting temperature of the inner coating.

13. The electrode of claim 3, wherein the lithium chloride content of the outer coating is 1.5–2.5 weight percent.

14. The electrode of claim 3, wherein said remainder is a mixture of potassium nitrate and sodium nitrate.

15. The electrode of claim 14, wherein the outer coating consists essentially of about 2.1 percent by weight lithium chloride, 44.9 percent by weight sodium nitrate and 53.0 percent by weight potassium nitrate.

References Cited

UNITED STATES PATENTS

| | | | |
|---|---|---|---|
| 3,282,817 | 11/1966 | Riseman et al. | 204—195.1 |
| 3,429,785 | 2/1969 | Ross | 204—1.1 |
| 3,438,886 | 4/1969 | Ross | 204—195 |
| 3,445,365 | 5/1969 | Ross | 204—195 |

T. TUNG, Primary Examiner